(12) United States Patent
Nguyen et al.

(10) Patent No.: US 11,731,219 B2
(45) Date of Patent: Aug. 22, 2023

(54) POPPET, ASSEMBLY, AND METHODS OF ASSEMBLING AND USING THE SAME

(71) Applicant: SAINT-GOBAIN PERFORMANCE PLASTICS CORPORATION, Solon, OH (US)

(72) Inventors: Hy B. Nguyen, Upland, CA (US); Kevin Nakasone, Torrance, CA (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 0 days.

(21) Appl. No.: 17/116,397

(22) Filed: Dec. 9, 2020

(65) Prior Publication Data
US 2021/0187675 A1 Jun. 24, 2021

Related U.S. Application Data

(60) Provisional application No. 62/950,450, filed on Dec. 19, 2019.

(51) Int. Cl.
| | |
|---|---|
| *B23P 15/00* | (2006.01) |
| *F16K 27/02* | (2006.01) |
| *F16K 11/044* | (2006.01) |
| *F16K 31/122* | (2006.01) |
| *F16K 41/10* | (2006.01) |
| *F16K 15/18* | (2006.01) |

(52) U.S. Cl.
CPC .......... *B23P 15/002* (2013.01); *F16K 11/044* (2013.01); *F16K 15/18* (2013.01); *F16K 27/0263* (2013.01); *F16K 31/1221* (2013.01); *F16K 41/10* (2013.01)

(58) Field of Classification Search
CPC .. F16K 27/0263; F16K 31/1221; F16K 41/10; F16K 11/02; F16K 11/022; F16K 11/04; F16K 11/044; B23P 15/002
See application file for complete search history.

(56) References Cited

U.S. PATENT DOCUMENTS

| | | | |
|---|---|---|---|
| 3,180,360 A * | 4/1965 | Pavlin | F16K 1/54 137/625.5 |
| 3,563,268 A * | 2/1971 | Williams | F22D 11/00 137/386 |
| 3,688,790 A | 9/1972 | Esten | |
| 4,290,440 A | 9/1981 | Sturgis | |
| 4,565,217 A * | 1/1986 | McIntyre | B05C 5/0225 137/563 |

(Continued)

FOREIGN PATENT DOCUMENTS

| | | |
|---|---|---|
| GB | 2348268 A | 9/2000 |
| JP | S51144840 U | 11/1976 |

(Continued)

OTHER PUBLICATIONS

International Search Report and Written Opinion for PCT/US2020/063949, dated Mar. 15, 2021, 11 pages.

*Primary Examiner* — Marina A Tietjen
(74) *Attorney, Agent, or Firm* — Abel Schillinger, LLP; Chi Suk Kim

(57) ABSTRACT

A poppet including a single-piece, unitary body defining a plurality of discrete sealing surfaces and a mechanical attachment configured to engage the body with a piston of a valve assembly.

15 Claims, 5 Drawing Sheets

(56) References Cited

U.S. PATENT DOCUMENTS

| | | | | |
|---|---|---|---|---|
| 4,907,741 A | * | 3/1990 | McIntyre | B05B 7/0475 |
| | | | | 239/124 |
| 5,007,458 A | | 4/1991 | Marcus et al. | |
| 5,575,311 A | * | 11/1996 | Kingsford | F16K 11/022 |
| | | | | 137/625.5 |
| 5,924,441 A | | 7/1999 | Leys et al. | |
| 5,954,086 A | * | 9/1999 | Ronchi | B65B 39/004 |
| | | | | 222/149 |
| 5,993,412 A | | 11/1999 | Deily et al. | |
| 6,086,039 A | | 7/2000 | Sievers et al. | |
| 6,575,187 B2 | * | 6/2003 | Leys | F16K 11/048 |
| | | | | 137/15.21 |
| 8,205,630 B2 | | 6/2012 | McKee | |
| 8,726,935 B2 | * | 5/2014 | Leys | B01F 5/0077 |
| | | | | 137/606 |
| 8,991,427 B2 | * | 3/2015 | Larsen | F16K 11/044 |
| | | | | 137/625.5 |
| 9,151,401 B2 | * | 10/2015 | Burgett | F16K 31/1221 |
| 2007/0251588 A1 | | 11/2007 | Linder et al. | |
| 2008/0217573 A1 | | 9/2008 | Pulcini et al. | |
| 2009/0301584 A1 | | 12/2009 | McKee | |
| 2012/0017997 A1 | * | 1/2012 | Ho | F16K 11/044 |
| | | | | 137/1 |
| 2013/0341550 A1 | * | 12/2013 | Fukano | F16K 31/1221 |
| | | | | 251/331 |

FOREIGN PATENT DOCUMENTS

| | | |
|---|---|---|
| JP | 2001108131 A | 4/2001 |
| JP | 2009058057 A | 3/2009 |
| KR | 100561208 B1 | 3/2006 |
| KR | 102165250 B1 * | 10/2020 |
| TW | M364146 U | 9/2009 |
| WO | 2021126620 A1 | 6/2021 |

* cited by examiner

POPPET, ASSEMBLY, AND METHODS OF ASSEMBLING AND USING THE SAME

CROSS-REFERENCE TO RELATED APPLICATION(S)

This application claims priority under 35 U.S.C. § 119(e) to U.S. Provisional Application No. 62/950,450, entitled "POPPET, ASSEMBLY, AND METHODS OF ASSEMBLING AND USING THE SAME," by Hy B. NGUYEN et al., filed Dec. 19, 2019, which is assigned to the current assignee hereof and incorporated herein by reference in its entirety.

FIELD OF THE DISCLOSURE

This disclosure, in general, relates to poppets used in a number of assemblies, including valves, and methods for their use and assembly.

BACKGROUND

Various industries rely on poppets within valves and other similar assemblies to contact another component of the assembly to provide a barrier to fluid movement. For example, a poppet may be disposed in a valve to control the flow of fluid, such as corrosive component fluids dispensed in the semiconductor industry, between an inlet port and at least one outlet passage, such as in a three-way poppet style valve assembly design. Traditionally, to assemble such valves and other similar assemblies, the poppet and a seat of the valve or other assembly are heated up and the plastic poppet is mechanically pressed ("press-fit") into the valve assembly through the seat before installation of both components into the rest of the valve or other similar assembly. This may provide inconsistent deformation of the seat or poppet due to different thermal properties and heating circumstances, which may lead to misalignment and incomplete sealing between the poppet and other components of the assembly. Therefore, there exists a need for poppet designs that provide improved sealing performance within valves and other similar assemblies.

BRIEF DESCRIPTION OF THE DRAWINGS

The present disclosure may be better understood, and its numerous features and advantages made apparent to those skilled in the art by referencing the accompanying drawings.

Figure 1A:
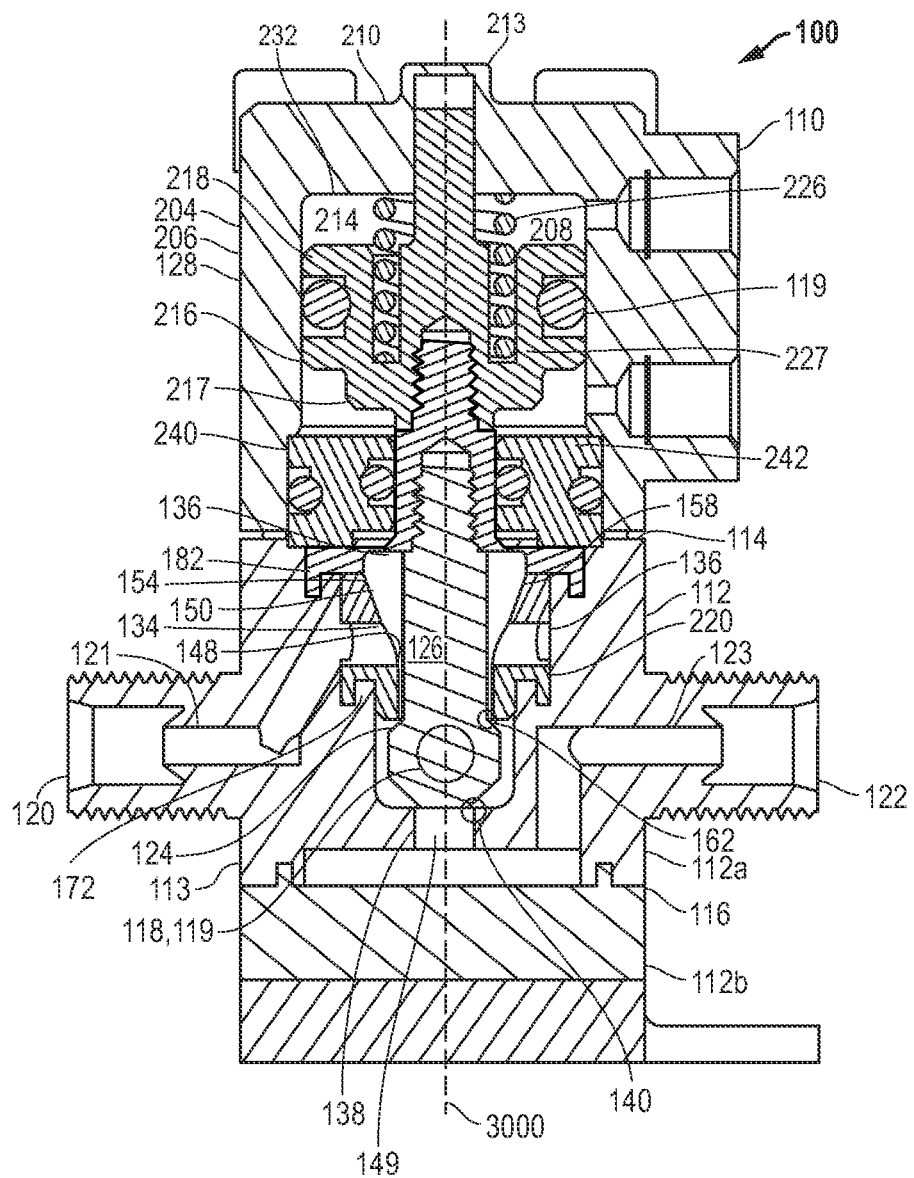
FIG. 1A includes an illustration of a cross-sectional view of an exemplary three-way valve containing a poppet according to a number of embodiments.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention. The use of the same reference symbols in different drawings indicates similar or identical items.

DESCRIPTION OF THE DRAWING(S)

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single embodiment is described herein, more than one embodiment may be used in place of a single embodiment. Similarly, where more than one embodiment is described herein, a single embodiment may be substituted for that more than one embodiment.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the poppet and valve or similar assembly arts.

For purposes of illustration, FIG. 1A includes an illustration of a cross-sectional view of an exemplary three-way valve assembly (generally designated 100) containing a poppet according to a number of embodiments. The valve assembly 100 is exemplary in and not meant to limit the potential assemblies that the poppet may be used in. The valve assembly 100 may extend in the axial direction relative to a central axis 3000. The central axis 3000 is oriented longitudinally extending along the length of the valve assembly 100. In a number of embodiments, the valve assembly 100 includes a housing 110. The housing 110 may include an actuator assembly 128. The housing 110 may further include a valve body 112. The valve body 112 may have an outside wall surface 113 configured in a number of different shapes such as cylindrical, square, hexagonal, octagonal or the like when viewed in horizontal cross section. The valve body 112 may have an open top end 114 near the top of the valve body 112 and a closed bottom end 116 near the bottom of the valve body 112. The valve body 112 may include an upper portion 112a and a lower portion 112b. In a number of embodiments, the upper portion 112a and the lower portion 112b of the valve body 112 may form a mechanical interface. The mechanical interface may couple the upper portion and the lower portion form a mechanical interface through a tongue and groove arrangement. In a number of embodiments, the mechanical interface may be accomplished through a tongue and groove arrangement, as shown in FIG. 1A. The mechanical interface may be done other ways including, but not limited to, at least one of bolts, battens, buckle, clamp, clip, flange, frog, grommet, hook-and-eye, latch, peg, nail, rivet, screw anchor, snap fastener, stitch, threaded fastener, tie, toggle bolt, wedge anchor, or may be attached a different way.

The valve body 112 may define an inlet port 118 with an inlet passage 119 and at least one outlet port 120 with at least one outlet passage 121. In some embodiments, the valve body 112 may further define a second outlet port 122 with at least one outlet passage 123. A valve chamber 124 may be located in a central region of the valve body 112 and may be in communication with the inlet port 118, the first outlet port 120, and the second outlet port 122 through their respective passages. In a number of embodiments, at least two of the inlet port 118 and first and second outlet ports 120 and 122, respectively, may be spaced radially apart from each other around the periphery of the valve body 112 and may be positioned substantially in an axial plane near the center of the valve body 112. The inlet and outlet passages 119, 121, 123 may differ and vary in height from the axial plane of the inlet port 118 and first and second outlet ports 120 and 122, as shown in FIG. 1A. In a number of embodiments, at least one of the first outlet passage 121 and second outlet passage 123 may be substantially in the same axial plane. In a number of embodiments, the inlet passage 119 may be substantially in the same axial plane as at least one of the first outlet passage 121 or the second outlet passage 123.

Figure 2A:
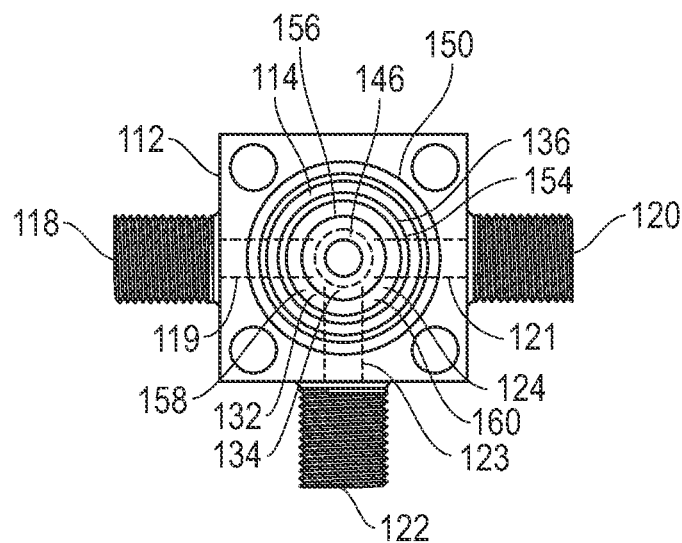
FIG. 2A includes an illustration of a top plain view of a valve body of the exemplary three-way valve of FIG. 1A according to a number of embodiments.
Figure 2B:
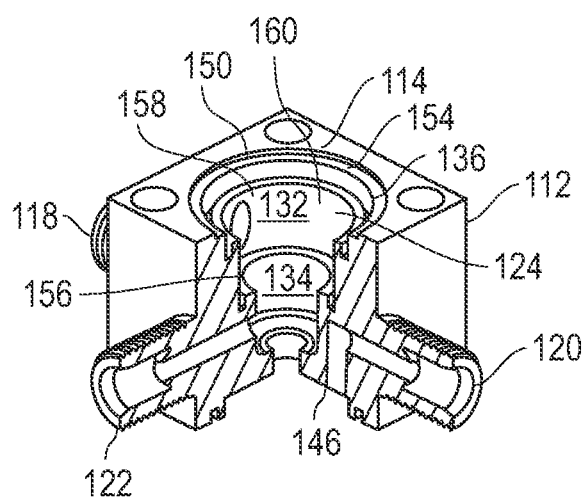
FIG. 2B includes an illustration of a cut-away side plain view of a valve body of the exemplary three-way valve of FIG. 1A according to a number of embodiments.

FIG. 2A includes an illustration of a top plain view of a valve body of the exemplary three-way valve of FIG. 1A. FIG. 2B includes an illustration of a cut-away side plain view of a valve body of the exemplary three-way valve of FIG. 1A. As shown in FIGS. 2A and 2B, the inlet port 118 and first outlet port 120 may be positioned at diametrically opposed sides of the valve body 112, i.e., 180 degrees apart, and the second outlet port 122 may be positioned between the inlet and first outlet ports, i.e., 90 degrees with respect to both the inlet and first outlet ports. It is to be understood that other spacings and positions of the inlet and first and second outlet parts can be used, if desired. For example, the valve body can be configured having the first and second outlet ports 120, 122 positioned at diametrically opposed locations, i.e., 180 degrees apart, with the inlet port 118 interposed between both outlet ports 120, 122, i.e., 90 degrees from both outlet ports 120, 122. The inlet and outlet ports 118, 120, 122 may be each configured having threaded wall portions to accommodate threaded connection with piping or tubing for carrying liquids or gases to and away from the valve assembly 100.

Referring back to FIG. 1A, in a number of embodiments, a poppet 126 may be disposed axially within the valve chamber 124. The poppet 126 may be displaced or actuated axially within the valve chamber 124 by an actuator assembly 128, disposed within the housing 110 of the valve assembly 100. In a number of embodiments, the actuator assembly 128 may be mounted to the top end 114 of the valve body 112. The actuator assembly 128, its connection to the valve body 112, and its operation to effect axial displacement of the poppet 126 is discussed in greater detail below.

The inlet port 118 may empty into the valve chamber 124 through the inlet passage 119. The valve chamber 124 may have an axis perpendicular to the inlet port 118 and may extend from the top end 114 to a position near the bottom end 116 of the valve body 112. As state above, the inlet passage 119 may pass through the valve body 112 with a slightly upward angle of departure as taken from an axis along the inlet port. Accordingly, in some embodiments, the inlet passage 119 may enter the valve chamber 124 at a location above the axis of the inlet port 118. The inlet passage 119 may enter through a side wall 132 of a central portion 134 of the valve chamber 124.

In a number of embodiments, the central portion 134 of the valve chamber 124 may have a cylindrical configuration and may include an open end 136 at its top and a partially closed end 138 at its bottom, wherein the top and bottom end may be separated by a side wall 132. A first valve seat 140 may extend circumferentially around the partially closed end 138 of the central portion 134 and face toward the top end 114 of the valve body 112.

The second outlet port 122 may be connected to a lower portion 142 of the valve chamber 124 that may extend from the partially closed end 138 of the central portion 134 to a position adjacent the bottom end 116 of the valve body 112. The lower portion 142 may have a generally cylindrical configuration. As best shown in FIG. 2, the second outlet passage 123 may extend through the valve body 112 and connect the second outlet port 122 to the lower portion 142 of the valve chamber 124. The second outlet passage 123 may pass through the valve body 112 with a slightly downward angle of departure as taken from an axis along the second outlet port 122. Accordingly, the second outlet passage 123 may enter the lower portion 142 of the valve chamber 124 at a location below the axis of the second outlet port 122. The second outlet passage 123 may enter the valve chamber 124 through a bottom wall 146 defining the lower portion 142 at the center of the lower portion 142, between the partially closed end 138 of the central portion 134 and the bottom end 116 of the valve body 112.

The valve chamber lower portion 142 may include a lower stem opening 149 having that extends vertically within the lower portion 142 adjacent the valve body bottom end 116. The lower stem opening 149 serves to align a stem of the poppet 126 within the chamber 124 and to accommodate slidable axial displacement of the same therein. The lower stem opening 149 connects to the second outlet passage 123.

The first outlet port 120 may be connected to an upper portion 150 of the valve chamber 124 through a first outlet passage 121. The upper portion 150 may extend vertically from a second valve seat 162 to the top end 114 of the valve body 112. The first outlet passage 121 may extend through a side wall 154 defining the upper portion 150 of the valve chamber 124 and provide fluid flow communication between the first outlet port 120 and the upper portion 150 of the valve chamber 124. The first outlet passage 121 may pass through the valve body 112 with a slightly upward angle of departure as taken from an axis along the first outlet port 120. Accordingly, the first outlet passage 121 may enter the upper portion 150 of the valve chamber 124 at a location above the axis of the first outlet port 120.

As shown best in FIGS. 1A and 2A-2B, the upper portion 150 may include a channel 156 defined along an outside surface by the side wall 154 and along an inside surface by a chamber wall 158. The chamber wall 158 may be disposed axially within the valve chamber 124 and extend vertically between the central 134 and upper chamber portions 150. As best shown in FIGS. 2A-2B, the channel 156 may extend concentrically around the valve chamber 124 from a position that includes the first outlet passage 121 a predetermined distance toward but not including the inlet passage 119. Referring now to FIG. 2B, in a number of embodiments, the portion of the valve body 124 diametrically opposite to the channel 156, i.e., the remaining 180 degrees extending concentrically from the inlet port 118 to the second outlet port 122 may include a solid portion of the valve body 112 which may extend vertically from the valve chamber central portion 134 to its upper portion 150 and may have a planer top surface 160 adjacent the open end 136 of the central portion 134.

Figure 1B:
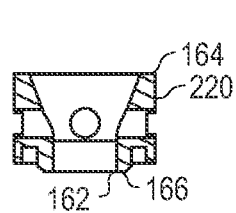
FIG. 1B includes an illustration of a cross-sectional view of a modular seat used in the exemplary three-way valve of FIG. 1A according to a number of embodiments.
Figure 1C:
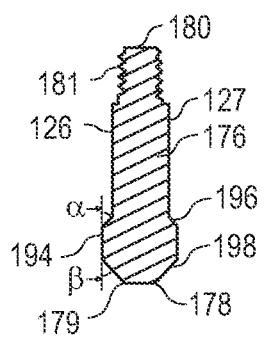
FIG. 1C includes an illustration of a cross-sectional view of a poppet used in the exemplary three-way valve of FIG. 1A according to a number of embodiments.
Figure 1D:
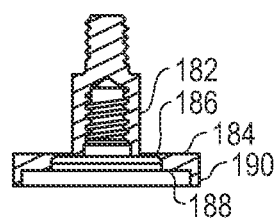
FIG. 1D includes an illustration of a cross-sectional view of a poppet and a diaphragm in the exemplary three-way valve of FIG. 1A according to a number of embodiments.

Referring back to FIG. 1A, the valve assembly 100 may further include a diaphragm 182. FIG. 1D includes an illustration of a cross-sectional view of a poppet and a diaphragm 182 in the exemplary three-way valve of FIG. 1A according to a number of embodiments. As shown in FIG. 1D, the diaphragm 182 may include a circular disk-shaped top side surface 184 having a centrally located deformable portion 186 that may contact the poppet 126. The diaphragm 182 may be positioned over the top end 114 of the valve body 112 with a bottom surface 188 facing the bottom end 116. The diaphragm 182 may include a lip 190 that extends downwardly from the bottom surface circumferentially around a peripheral edge that defines the outside diameter of the diaphragm 182. The lip 190 may be configured to be placed within a groove 192 that extends circumferentially around the top end 114 of the valve body. The diaphragm lip 190 fits within the groove 192 to form an air and liquid-tight seal between the upper portion 150 of the valve chamber and the top end 114 of the valve body.

Referring back to FIG. 1A, the valve assembly 100 may further include a modular seat 220. FIG. 1B includes an illustration of a cross-sectional view of a modular seat 220 used in the exemplary three-way valve of FIG. 1A according to a number of embodiments. As shown in FIG. 1B, the modular seat 220 may be non-integral and removable with the rest of the valve body 112. In a number of embodiments, a modular seat 220 may be disposed within the valve body 112 and interposed between the bottom surface 188 of the diaphragm, 182 and the valve chamber 124. The modular seat 220 may also serve to transmit a compressive force from the diaphragm 182 to effect both an air and liquid-tight seal between the diaphragm 182 and the upper portion 150 of the valve chamber 124, and to prevent axial movement of the diaphragm 182 during upwardly and downwardly directed operation of a piston 216 and axial displacement of the poppet 126 thereby. The modular seat may be in axial alignment with the piston 216. The piston 216 may be disposed within the housing 110 and be part of the actuator assembly 128 as discussed in further detail below. The modular valve seat may include at least a part of the upper portion 150 and/or the central portion 134 of the valve chamber 124, and forms a connection to at least one of the inlet passage 119, the first outlet passage 121 or the second outlet passage 123.

Figure 2C:
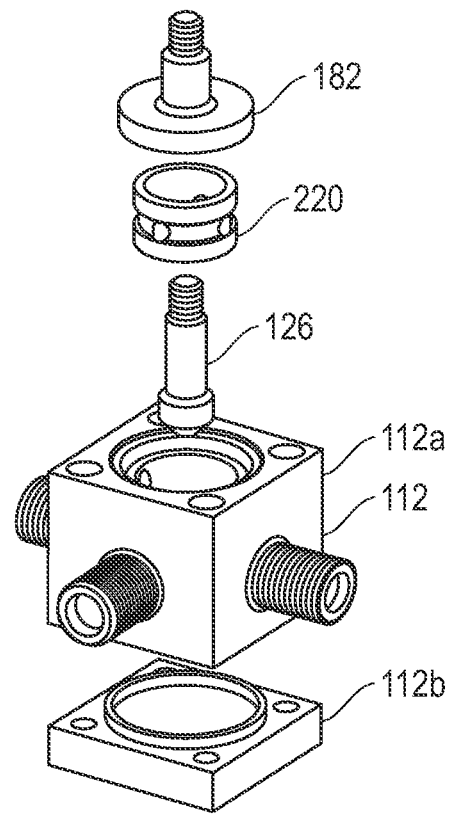
FIG. 2C includes an illustration of a side plain view of a poppet, modular seat, and valve body of the exemplary three-way valve of FIG. 1A according to a number of embodiments.

FIG. 2C includes an illustration of a side plain view of a poppet 126, modular seat 220, and valve body 112 of the exemplary three-way valve of FIG. 1A according to a number of embodiments. The modular seat 220 may house a second valve seat 162. In the exemplary valve assembly 100 of FIG. 1A, the second valve seat 162 may be disposed around the open end 136 of the central portion 134 and faces the bottom end 116 of the valve body. The modular seat 220 and/or second valve seat 162 may be separate from and not integral with the valve body 112.

Figure 5:
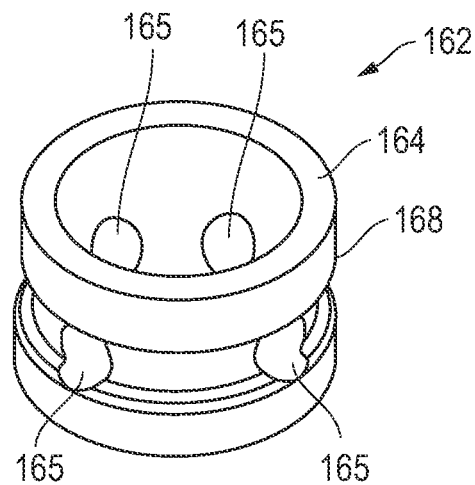
FIG. 5 is a perspective top view of a second valve seat used in the exemplary three-way valve of FIG. 1A according to a number of embodiments.
Figure 6:
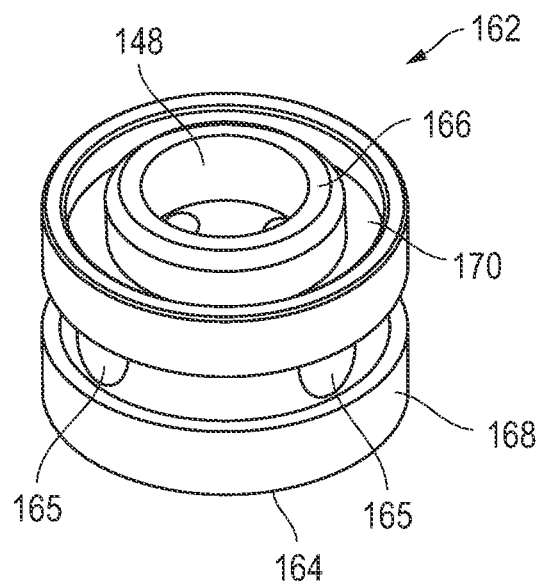
FIG. 6 is a perspective bottom view of the second valve seat used in the exemplary three-way valve of FIG. 1A according to a number of embodiments.

FIG. 5 is a perspective top view of a second valve seat used in the exemplary three-way valve of FIG. 1A according to a number of embodiments. FIG. 6 is a perspective bottom view of the second valve seat used in the exemplary three-way valve of FIG. 1A according to a number of embodiments. As shown best in FIGS. 5-6, the second valve seat 162 may have a generally cylindrical configuration with an open end 164 at one end of the seat and a partially closed end 166 at an opposite end of the seat, wherein the open and partially closed ends 164 and 166, respectively, may be separated by a cylindrical wall 168. As best seen in FIG. 6, the partially closed end 166 can include a groove 170 disposed circumferentially a predetermined depth within the partially closed end adjacent a peripheral edge of the wall 168. The groove 170 may be configured to complement and accommodate placement of a ridge 172 formed in the valve body 112, thereby forming a tongue and groove-type fitting arrangement. The ridge 172 may be positioned at the open end 136 of the valve chamber central portion 134 and extends circumferentially there around. The placement of the partially closed end 166 of the second valve seat 162 on the open end 136 of the valve chamber central portion 134 forms an air and liquid-tight seal between the wall 132 of the valve chamber central portion 134 and the partially closed end 166 of the second valve seat 162. As best seen in FIG. 5, the open end 164 of the second valve seat 162 may include a plurality of openings 165 through the cylindrical wall 168. The second valve seat 162 may have a second opening or second stem opening 148. The openings 165 serve to accommodate air or liquid transfer from the inlet port 118 to the first outlet port 120, as will be discussed in greater detail herein.

Referring again to FIG. 1A, the poppet 126 may be housed within the valve body 112. FIG. 1C includes an illustration of a cross-sectional view of a poppet used in the exemplary three-way valve of FIG. 1A according to a number of embodiments. As shown best in FIG. 1C, the poppet 126 may be a single piece, unitary body 127 and include a stem 176 disposed vertically within the valve chamber 124, i.e., the stem 176 may be positioned with its axis substantially parallel to the axis of the valve chamber 124. The poppet 126 and/or stem 176 may include a first axial end 180 at the top of the poppet 126 positioned adjacent the top end 114 of the valve body 112, and a second axial end 178 at the bottom of the poppet 126, which may be positioned adjacent the bottom end 116 of the valve body 112. The first axial end 180 may include a mechanical attachment 181 and a poppet cap 185 at the first axial end 180. The second axial end 178 may be housed within the first stem opening 149 of the lower portion 142 of the valve chamber 124 and may be sized to facilitate axial upward and downward displacement within the first stem opening 149.

The poppet 126 and/or stem 176 second axial end 178 may include a bottom edge 179 and an enlarged diameter section 194 integral with the stem 176 that extends radially away from the stem 176 a predetermined distance and may be positioned between the first valve seat 140 and the second valve seat 162. In a preferred embodiment, the enlarged diameter section 194 has a diameter of approximately 0.24 inches and has an axial length of approximately 0.10 inches. The bottom edge 179 may be planar and perpendicular to the central axis 3000 of the valve assembly when assembled. The enlarged diameter section 194 includes a plurality of discrete sealing surfaces. The plurality of discrete sealing surfaces may include an upper shoulder 196 positioned adjacent the second valve seat 162, and a lower shoulder 198 positioned adjacent the first valve seat 140, to accommodate sealing engagement with adjacent first valve seat 140 and the second valve seat 162, respectively. In other words, the first discrete sealing surface or upper shoulder 196 may be adapted to provide sealing contact with the modular seat at the second valve seat 162, and the second discrete sealing surface or lower shoulder 198 may be adapted to provide sealing contact with the valve body 112 at the first valve seat 140, where both discrete sealing surfaces 196, 198 may be offset from one another in the axial direction.

The first discrete sealing surface and/or upper shoulder 196 may form an angle α with a line parallel to the central axis 3000, wherein α may be at least 5°, such as at least 15°, such as at least 30°, such as at least 45°, or such as at least 60°. In a number of embodiments, α may be no greater than 180°, such as no greater than 150°, such as no greater than 130°, such as no greater than 90°, or such as no greater than 60°. The second discrete sealing surface and/or lower shoulder 198 may form an angle β with a line parallel to the central axis 3000, wherein β may be at least 5°, such as at least 15°, such as at least 30°, such as at least 45°, or such as at least 60°. In a number of embodiments, β may be no greater than 180°, such as no greater than 150°, such as no greater than 130°, such as no greater than 90°, or such as no greater than 60°. The bottom edge 179 may further intersect with at least one of the plurality of discrete sealing surfaces at an angle θ with the second discrete sealing surface and/or lower shoulder 198, wherein θ may be at least 5°, such as at least 15°, such as at least 30°, such as at least 45°, or such as at least 60°. In a number of embodiments, θ may be no greater than 180°, such as no greater than 150°, such as no greater than 130°, such as no greater than 90°, or such as no greater than 60°.

Referring back to FIG. 1A, the actuator assembly 128 may be positioned adjacent the top end 114 of the valve body 112. The actuator assembly may be attached by screws to the valve body 112 extending along the top end 114 of the valve body 112 within the housing 110. The actuator assembly 128 may include an actuator 204 that operates to axially displace the poppet 126 within the valve chamber 124 between a first position, with the lower shoulder 198 compressively engaged with the first valve seat 140, and a second position, with the upper shoulder 196 compressively engaged with the second valve seat 162. The type of actuator may be selected from the group of conventionally operated actuators including electrically, pneumatically, or manually operated actuators.

In an embodiment, the actuator 204 may include a standard electrical solenoid. The electrical solenoid 204 may include an electro-magnet 206 and a centrally located cavity 208 extending along an axis of the electro-magnet from a first or top end 210 at the top of the actuator assembly 128 to a second or bottom end 212 at the bottom of the actuator assembly adjacent the valve body top end 114 of the valve body 112. The cavity 208 may include an enlarged diameter section 214 near the first end 210 that accommodates slidable placement of the piston 216 therein. The piston 216 may be axially displaceable within the enlarged section 214 in response to the application of electricity to the electro-magnet 204 via wires. A cap 213 may be attached to the actuator assembly 128 at the first end 210. In a number of embodiments, the poppet 126 may include a mechanical attachment 181 at the first axial end 180 to mechanically attach to the piston 216. In a number of embodiments, the poppet 126 may be threadably attached to the piston 216 at the first axial end 180 at the top of the poppet 126 through the mechanical attachment 181. In an embodiment, the poppet 126 and the piston 216 may have coupling threadable attachments 181, 183 forming a threaded interface. The mechanical attachment 181, 183 may be done other ways including, but not limited to, at least one of bolts, battens, buckle, clamp, clip, flange, frog, grommet, hook-and-eye, latch, peg, nail, rivet, screw anchor, snap fastener, stitch, threaded fastener, tie, toggle bolt, wedge anchor, or may be attached a different way.

The piston 216 may include a piston housing 218. The piston housing 218 can include a leading surface 217 to engage a gland 240. The gland 240 may be in axial alignment with the piston 216. The diaphragm 182 may also be in axial alignment with the piston 216. The piston housing 218 can include at least one annular cavity 119 that may include a seal. A spring 226 may be disposed within a spring cavity 227 of the piston 216 and may be interposed between the piston 216 and a neck portion 228 of the cavity 208. The spring 226 may serve to maintain the piston 216 at a position within the enlarged diameter section 214 such that the leading surface 217 of the piston 216 may be remote from an adjacent portion 232 of the electro-magnet when the electro-magnet is not activated. In this position, the spring 226 may impose a sufficient upwardly directed force on the poppet 126 to cause the valve poppet upper shoulder 196 to compressively engage the second valve seat 162. As will be discussed in greater detail below, the position of the piston 216 as shown in FIG. 1A corresponds to the second position of the poppet 126 vis-a-vis the valve chamber 124.

In a number of embodiments, the gland 240 may be interposed between the actuator 204 and the top surface 184 of the diaphragm, 182. The gland 240 may serve to transmit a compressive force from the actuator 204 onto the disk-shaped surface 184 of the diaphragm 182 to effect both an air and liquid-tight seal between the diaphragm 182 and the upper portion 150 of the valve chamber 124, and to prevent axial movement of the diaphragm 182 during upwardly and downwardly directed operation of the piston 216 and axial displacement of the poppet 126 thereby. Accordingly, the poppet 126 extends from the piston 116, through the gland 240, through the diaphragm 182, through the modular seat 220 and into the valve chamber 124. The gland 240 may be an annular structure defining a central bore through which the piston 216 extends. The gland 240 may include a head 242 that may be engaged between the piston 216 and the housing 110 and/or actuator assembly 128 and can be secured between the two by compression. In addition, the gland 240 may include annular cavities 244, 246 within which seals can extend annularly in contact with the housing 110 and/or actuator assembly 128. In an embodiment, the gland 240 may secure the poppet 126 axially against at least one of the housing 110, valve body 112, and/or actuator assembly 128.

Figure 3:
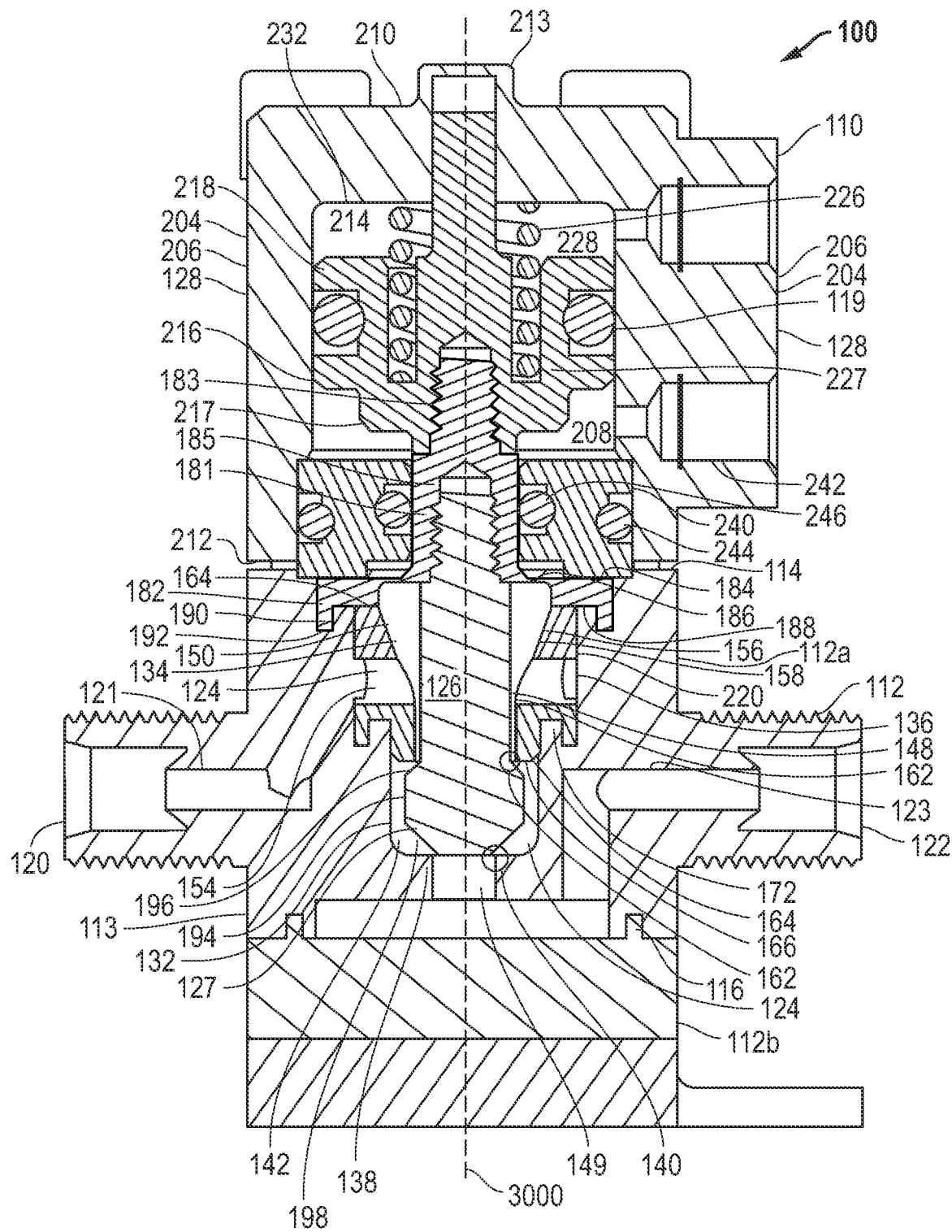
FIG. 3 includes an illustration of a cross-sectional view of an activated state of the exemplary three-way valve of FIG. 1A according to a number of embodiments.

FIG. 3 includes an illustration of a cross-sectional view of an activated state of the exemplary three-way valve of FIG. 1A according to a number of embodiments. When the actuator 204 is in the activated state, as shown in FIG. 3, the spring 226 imposes an upwardly directed compression force against the piston 216 that may be transmitted to the poppet 126, placing the poppet 126 into its "second position" with the upper shoulder 196 compressively engaged against the second valve seat 162. In this second position, air or liquid entering the inlet port 118 flows into the central portion 134 of the valve chamber 124 and may be directed to the second outlet passage 123 and second outlet port 122 for distribution to a desired fluid-handling device. The action of the upper shoulder 196 against the second valve seat 162 prohibits the flow of air or liquid from the inlet port to enter the upper portion 150 of the valve chamber 24 and, thus preventing it from being routed to the first outlet port 120.

Figure 4:
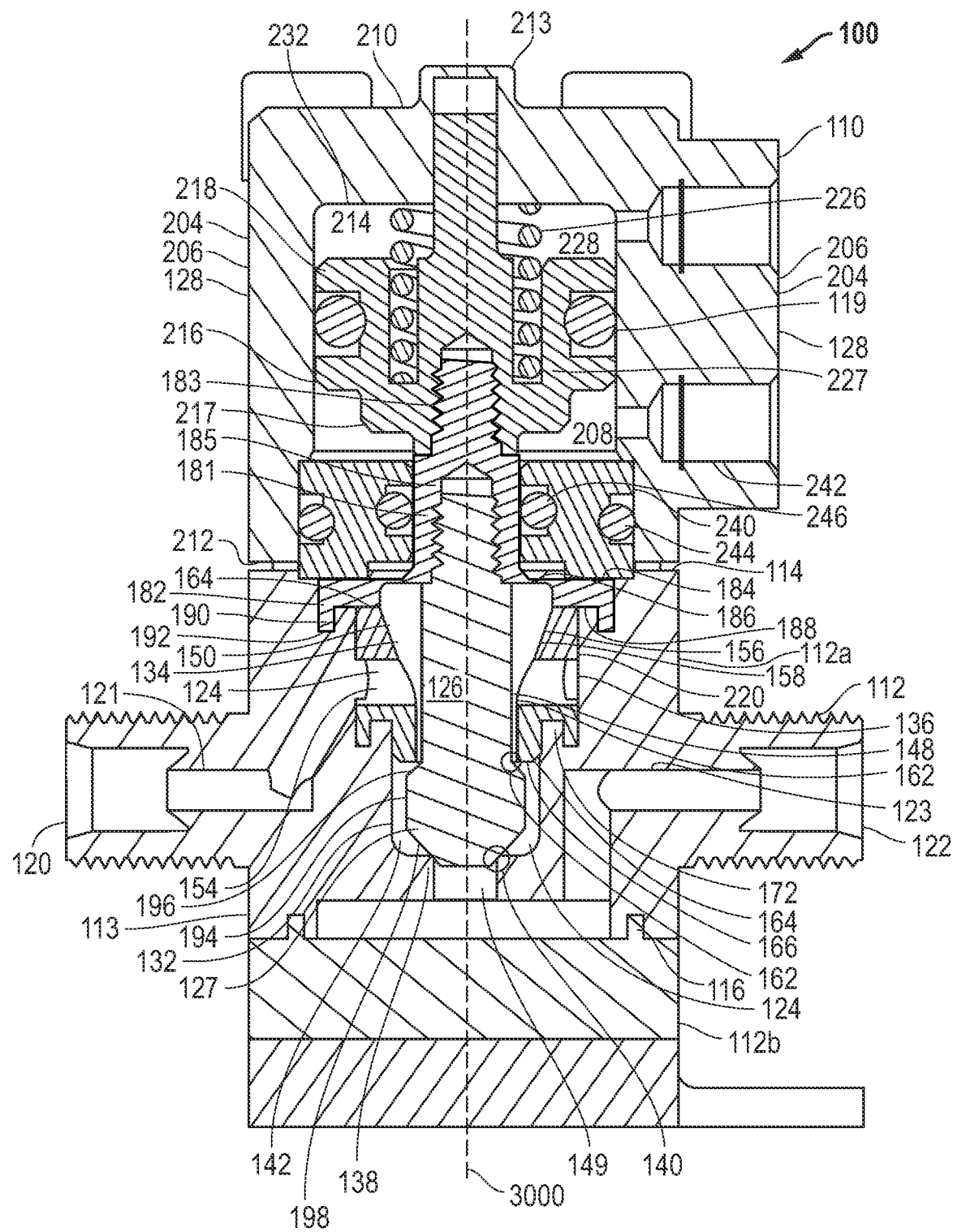
FIG. 4 includes an illustration of a cross-sectional view of a de-activated state of the exemplary three-way valve of FIG. 1A according to a number of embodiments.

FIG. 4 includes an illustration of a cross-sectional view of a de-activated state of the exemplary three-way valve of FIG. 1A according to a number of embodiments. Alternatively, when the actuator 204 is in the de-activated state, as shown in FIG. 4, electricity may be routed to the electro-magnet 206, causing the leading surface 217 of the piston 216 to engage the adjacent portion 232 of the electro-magnet 206 and axially displace the poppet 126 in a downward direction to place the poppet 126 in what is called herein the "first position" within valve chamber 124 with the lower shoulder 198 compressively engaged with the first valve seat 140. In this position, air or liquid entering the inlet port 118 is caused to flow into the central portion 134 of the valve chamber 124, past the upper shoulder 196 and second valve seat 162, through the openings 165, into the upper portion 150 of the valve chamber 124. The air or liquid entering the upper portion 150 through the channel 156, first outlet passage 121 and first outlet port 120, and to a desired fluid-handling device.

The components of the valve assembly 100 may be made from a material that displays properties of good chemical and thermal resistance. Such properties are desirable if the valve assembly 100 is to be used in the semiconductor manufacturing industry or in any other industry where corrosive chemicals are to be passed through the valve or where it is desirable that a high degree of chemical purity of the process chemical passed through the valve be maintained. In the semiconductor manufacturing industry, highly corrosive process chemicals such as strong inorganic acids, strong inorganic bases, strong solvents, and peroxides are used during the etching operation and are oftentimes heated to enhance the etching action of the chemicals, and thus enhance the efficiency of the etching operation. It is, therefore, important that a valve used to distribute the flow of such process chemicals be both chemically and thermally resistant to provide dependable operation without the potential for valve failure, which may result in leakage of the corrosive chemicals and associated vapors from the valve, where it could cause a hazard to the environment and/or a danger to nearby operators.

Additionally, it may be important that the valve assembly 100 be chemically resistant so that it will not degrade upon contact with the process chemicals and introduce contamination into chemically pure process liquids. The introduction of such contaminants may cause hundreds of thousands of dollars of damage to a batch of semiconductors undergoing treatment with such process chemicals.

In an embodiment, the components of the valve assembly 100 described above may be constructed from a fluoropolymer compound selected from the group of fluoropolymers including polytetrafluoroethylene (PTFE), fluorinated ethylene-propylene (FEP), perfluoroalkoxy fluorocarbon resin (PFA), polychlorotrifluoroethylene (PCTFE), ethylene-chlorotrifluoroethylene copolymer (ECTFE), ethylene-tetrafluoroethylene copolymer (ETFE), polyvinylidene fluoride (PVDF), polyvinyl fluoride (PVF) and the like. A particularly preferred material may be Teflon (a registered Trademark) PFA or Teflon FEP, which are provided by DuPont Company of Wilmington, Del. Such materials are not damaged by corrosive, acidic, or caustic liquids and do not introduce contamination into chemically pure liquids.

During assembly of the valve assembly 100 the modular seat 220 may be installed into the valve chamber 124 and the poppet 126 may be inserted through the diaphragm 182 and mechanically attached to the piston 216 so that the second valve seat 162 may be disposed between the diaphragm 182 and the upper shoulder portion 176 of the poppet 126. The installation of the poppet 126 through the second valve seat 162 may be possible because of the respective diameters of the second stem opening 148 in the second valve seat (best seen in FIGS. 5 and 6) and the enlarged diameter section 194 of the poppet 126 may be of sufficient dimension to accommodate placement of the enlarged portion through the stem opening 148 during the installation of the poppet 126 into the valve chamber 124. In one embodiment, the modular seat 220 (including the second valve seat 162) may be inserted into the valve assembly 100 without any heating process. Further, the poppet 126 may be inserted through the diaphragm 182 and mechanically attached to the piston 216 so that the second valve seat 162 may be disposed between the diaphragm 182 and the upper shoulder portion 176 of the poppet 126 without any heating process.

In still another embodiment, a lubricant such as isopropyl alcohol and the like may be used on the poppet 126 and/or second valve seat 162 to facilitate insertion of the enlarged diameter section 194 through the second stem opening 148. Regardless of which of the above-described embodiments may be used to install the poppet 126, the respective diameters of the second stem opening 148 and enlarged diameter section 194 may be such that forcible installation can be achieved without adversely affecting the ability of second valve seat 162 to provide an air and liquid-tight seal between the upper shoulder 196 and the second seat 162 after the poppet 126 has been installed within the valve chamber 124.

Although limited embodiments of the valve assembly 100 have been specifically described and illustrated herein, many modifications and variations will be apparent to those skilled in the art. For example, a valve assembly 100 can be constructed to accommodate two inlet flows and control the dispersal of fluid through the valve assembly 100 from one or the other inlet to a single outlet without departing from the scope of this invention. In such an embodiment, the flow would be the reverse of that described and each inlet flow would enter the valve body 112 via respective first and second outlet ports 120 and 122. When the poppet 126 is axially displaced in the "first position" fluid would flow from the first outlet port 120, through the valve chamber 126 and to the inlet port 118. When the poppet 126 is axially displaced in the "second position" fluid would flow from the second outlet port 122, through the valve chamber 126 and to the inlet port 118.

Note that not all of the activities described above in the general description or the examples are required, that a portion of a specific activity may not be required, and that one or more further activities may be performed in addition to those described. Still further, the order in which activities are listed are not necessarily the order in which they are performed.

Such assemblies noted above are all exemplary and are not meant to limit the use of the poppet 126 in potential other assemblies, including non-valve assemblies. For example, the poppet 126 may be used in displacement pump assembly, manifold, or other assembly applications with sealing and fluid movement requirements.

The method of assembling a valve assembly or similar assembly 100 may include translating a single-piece, unitary poppet 126 through a modular seat 220 of a valve assembly 100 without substantial deformation of the modular seat 220. The method may further include mechanically attaching the poppet 126 to a piston 216 of the valve assembly 100. The mechanical attaching of the poppet 126 to the piston 216 may occur through the modular seat 220 in the upper portion 150 and/or the central portion 134 of the valve chamber 124. The mechanical attaching of the poppet 126 to the piston 216 may be done through a threaded interface. The poppet 126 may further include a plurality of discrete sealing surfaces where at least one of the plurality of discrete sealing surfaces may be disposed radially between the poppet 126 and the modular seat 220, and where at least one of the plurality of discrete sealing surfaces may be disposed radially between the poppet 126 and a valve body 112 of the valve assembly 100. The method may further include axially translating the poppet 126 from a first sealed position in contact with the modular seat 220 to a second sealed position in contact with the valve body 112.

According to embodiments herein, the poppet can better streamline the assembly process through its robust configuration. Namely, the poppet may be assembled through the modular seat and mechanically attach to the piston through the diaphragm without requiring a heating or cooling process. This may limit deformation of the poppet, modular seat, and other elements of the valve assembly, providing more contact between the sealing surfaces of the poppet and the valve assembly. As a result, the poppet and resulting assembly according to embodiments herein may decrease increase lifetime and improving effectiveness and performance of the assembly, the poppet, modular seat, and its other assembly components.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1: A poppet comprising: a single-piece, unitary body defining a plurality of discrete sealing surfaces and a mechanical attachment configured to engage the body with a piston of a valve assembly.

Embodiment 2: A valve assembly comprising: a housing defining a central axis, the housing comprising a valve body comprising an inlet passage and at least one outlet passage; a piston disposed within the housing; a modular seat disposed within the valve body in axial alignment with the piston; and a poppet comprising: a single-piece, unitary body defining a first axial end comprising a mechanical attachment adapted to mechanically attach to the piston, and a second axial end comprising a plurality of discrete sealing surfaces comprising a first discrete sealing surface and a second discrete sealing surface, wherein the first discrete sealing surface is adapted to provide sealing contact with the modular seat and the second discrete sealing surface is adapted to provide sealing contact with the valve body, wherein both discrete sealing surfaces are offset from one another in the axial direction.

Embodiment 3: A method comprising: translating a single-piece, unitary poppet through a modular seat of a valve assembly without substantial deformation of the modular seat; and mechanically attaching the poppet to a piston of the valve assembly.

Embodiment 4: The method of embodiment 3, wherein the valve assembly further comprises a housing defining a central axis, the housing comprising a valve body comprising an inlet passage and at least one outlet passage.

Embodiment 5: The method of embodiment 3, wherein mechanically attaching the poppet occurs through the modular seat.

Embodiment 6: The method of embodiment 3, wherein the poppet is mechanically attached to the piston through a threaded interface.

Embodiment 7: The method of embodiment 4, further comprising axially translating the poppet from a first sealed position in contact with the modular seat to a second sealed position in contact with the valve body.

Embodiment 8: The method of embodiment 7, wherein the poppet comprises a plurality of discrete sealing surfaces, wherein at least one of the plurality of discrete sealing surfaces is disposed radially between the poppet and the modular seat, and wherein at least one of the plurality of discrete sealing surfaces is disposed radially between the poppet and the valve body of the valve assembly.

Embodiment 9: The valve assembly or method of any of embodiments 2-8, wherein the valve assembly further comprises a gland in axial alignment with the piston.

Embodiment 10: The valve assembly or method of any of embodiments 2-9, wherein the valve assembly further comprises a diaphragm in axial alignment with the piston.

Embodiment 11: The valve assembly or method of any of embodiments 2 and 4-10, wherein the at least one outlet passage comprises a first outlet passage and second outlet passage, wherein the first outlet passage and the second outlet passage are substantially in the same axial plane.

Embodiment 12: The valve assembly or method of embodiment 11, wherein the inlet passage is substantially in the same axial plane as at least one of the first outlet passage or the second outlet passage.

Embodiment 13: The valve assembly or method of any of embodiments 2-11, wherein the housing further comprises an actuator assembly adapted to translate the piston in the axial direction.

Embodiment 14: The valve assembly of any of embodiments 2 and 4-11, wherein the modular seat comprises a part of a valve chamber and forms a connection between the valve chamber, the inlet passage, and the at least one outlet passage.

Embodiment 15: The poppet, valve assembly, or method of any of the preceding embodiments, wherein the poppet may include a bottom edge that is planar and intersects at least one of the plurality of discrete sealing surfaces at an angle $\theta$ with the central axis, wherein $\theta$ is at least 5°, such as at least 15°, such as at least 30°, such as at least 45°, or such as at least 60°.

Embodiment 16: The poppet, valve assembly, or method of any of the preceding embodiments, wherein at least one of the discrete sealing surfaces forms an angle α with a line parallel to the central axis, wherein α is at least 5°, such as at least 15°, such as at least 30°, such as at least 45°, or such as at least 60°.

Embodiment 17: The poppet, valve assembly, or method of any of the preceding embodiments, wherein at least one of the discrete sealing surfaces forms an angle β with a line parallel to the central axis, wherein (3 is at least 5°, such as at least 15°, such as at least 30°, such as at least 45°, or such as at least 60°.

Embodiment 18: The poppet, valve assembly, or method of any of the preceding embodiments, wherein the poppet comprises a polymer comprising polyketone, polyaramid, a thermoplastic polyimide, a polyetherimide, a polyphenylene sulfide, a polyethersulfone, a polysulfone, a polyphenylene sulfone, a polyamideimide, ultra high molecular weight polyethylene, a fluoropolymer, a polyamide, a polybenzimidazole, or any combination thereof.

Embodiment 19: The poppet, valve assembly, or method of any of the preceding embodiments, wherein the poppet comprises a metal.

Embodiment 20: The poppet, valve assembly, or method of any of the preceding embodiments, wherein the valve body comprises an upper portion and a lower portion, wherein the upper portion and the lower portion form a mechanical interface through a tongue and groove arrangement.

Note that not all of the features described above are required, that a region of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments, however, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

What is claimed is:

1. A valve assembly comprising:
    a housing defining a central axis, the housing comprising a valve body comprising an inlet passage and at least one outlet passage;
    a piston disposed within the housing;
    a modular seat disposed within the valve body in axial alignment with the piston; and
    a poppet comprising:
       a single-piece, unitary body defining a first axial end comprising a mechanical attachment comprising an outwardly threaded interface adapted to mechanically attach to the piston, and
       a second axial end comprising a plurality of discrete sealing surfaces comprising a first discrete sealing surface and a second discrete sealing surface, wherein the first discrete sealing surface is adapted to provide sealing contact with the modular seat and the second discrete sealing surface is adapted to provide sealing contact with the valve body, wherein both discrete sealing surfaces are offset from one another in the axial direction, wherein the valve assembly further comprises a diaphragm in axial alignment with the piston.

2. The valve assembly of claim 1, wherein the valve assembly further comprises a gland in axial alignment with the piston.

3. The valve assembly of claim 1, wherein the at least one outlet passage comprises a first outlet passage and second outlet passage, wherein the first outlet passage and the second outlet passage are substantially in the same axial plane.

4. The valve assembly of claim 3, wherein the inlet passage is substantially in the same axial plane as at least one of the first outlet passage or the second outlet passage.

5. The valve assembly of claim 1, wherein the housing further comprises an actuator assembly adapted to translate the piston in the axial direction.

6. The valve assembly of claim 1, wherein the modular seat comprises a part of a valve chamber and forms a connection between the valve chamber, the inlet passage, and the at least one outlet passage.

7. The valve assembly of claim 1, wherein at least one of the discrete sealing surfaces forms an angle α with a line parallel to the central axis, wherein α is at least 5°.

8. The valve assembly of claim 1, wherein at least one of the discrete sealing surfaces forms an angle β with a line parallel to the central axis, wherein β is at least 5°.

9. The view assembly of claim 1, wherein the poppet comprises a polymer comprising polyketone, polyaramid, a thermoplastic polyimide, a polyetherimide, a polyphenylene sulfide, a polyethersulfone, a polysulfone, a polyphenylene sulfone, a polyamideimide, ultra high molecular weight polyethylene, a fluoropolymer, a polyamide, a polybenzimidazole, or any combination thereof.

10. The view assembly of claim 1, wherein the poppet comprises a metal.

11. The view assembly of claim 1, wherein the valve body comprises an upper portion and a lower portion, wherein the upper portion and the lower portion form a mechanical interface through a tongue and groove arrangement.

12. A method comprising:
    translating a single-piece, unitary poppet defining a plurality of discrete sealing surfaces through a modular seat of a valve assembly without substantial deformation of the modular seat; and mechanically attaching the poppet to a piston of the valve assembly through an outwardly threaded interface on the poppet, wherein the valve assembly further comprises a diaphragm in axial alignment with the piston, wherein mechanically attaching the poppet occurs through the modular seat.

13. The method of claim 12, wherein the valve assembly further comprises a housing defining a central axis, the housing comprising a valve body comprising an inlet passage and at least one outlet passage.

14. The method of claim 13, further comprising axially translating the poppet from a first sealed position in contact with the modular seat to a second sealed position in contact with the valve body.

15. The method of claim 14, wherein the poppet comprises a plurality of discrete sealing surfaces, wherein at least one of the plurality of discrete sealing surfaces is disposed radially between the poppet and the modular seat, and wherein at least one of the plurality of discrete sealing surfaces is disposed radially between the poppet and the valve body of the valve assembly.

\* \* \* \* \*